United States Patent Office 3,482,059

Patented Dec. 2, 1969

3,482,059

SUPERVISORY CIRCUITS FOR CHECKING A REPEATER IN A CARRIER CURRENT COMMUNICATION SYSTEM

John Frederick Tilly, Aldwych, London, England, assignor to International Standard Electric Corporation, New York, N.Y., a corporation of Delaware Filed Oct. 13, 1965, Ser. No. 495,481
Claims priority, application Great Britain, Nov. 9, 1964, 45,544/64
Int. Cl. H04b 3/46, 3/36
U.S. Cl. 179—175.31 8 Claims

ABSTRACT OF THE DISCLOSURE

Repeater supervisory signals are extracted from a line via a bridge network which is arranged to act as a noise stop filter. The modified signals are returned to the line via a second bridge network which has the characteristics of a line equalizer. These two networks are connected in Tandem. The circuit is arranged so that while the loss from a line to the supervisory equipment is low, short or open circuits in the supervisory equipment do not affect transmission in the main path. At the same time sufficient loss is provided in the supervisory loop to give a high singing margin.

This invention relates to improvements in carrier current communication systems incorporating repeaters and particularly reference in supervisory arrangements for the individual repeaters in these systems.

In long telecommunication systems using a number of repeaters in tandem, various methods are known for testing the performance of an amplifier in any repeater. Generally, this is done by transmitting along the line from one of the terminal stations an interrogating signal which signal is modified in the repeater under test and is returned to the interrogating terminal where the amplitude or other characteristic of the received signal is used to provide an indication of the state of the repeater amplifier.

In one particular type of supervisory equipment the amplifier of a repeater is tested for gain by transmitting an interrogating signal having two components. The frequencies of the components are selected to fall within the frequency band corresponding to one direction of transmission. At the repeater to be tested these components are picked off by suitable filters and applied to a modulator. At the modulation output a sideband is selected having a frequency corresponding to the opposite direction of transmission by a further filter and this sideband is returned via the repeater to the interrogating terminal. The amplitude of the received signal is an indication of the gain of the repeater amplifier.

To measure the noise generated in an amplifier a single frequency interrogating signal is transmitted. This signal and a band of noise lying above that pair of the frequency spectrums used for traffic are applied to the modulator as in the case of the gain test, and the frequency shifted noise spectrum is returned to the interrogating terminal. A supervisory system of this type is described in United Kingdom patent specification No. 828,061. When more than one repeater is used on a route, the selection of a particular repeater can be either on a frequency or time basis. In the former each repeater is distinguished from the others by having allocated to it a set of specific test frequencies. In the latter, also known as the pulse method, the same test tone is used for all the repeaters. The interrogating signals are short pulses and the returned signals are identified in accordance with the time interval between the transmitted and received signals.

The design of supervisory equipment presents certain difficulties because it must satisfy several contradictory requirements. In particular, supervisory equipment must in no way interfere with the transmission of the communication channels. The bridging of the supervisory equipment across the main transmission path must be carried out in such a way that even if the equipment becomes open or short circuited it will not alter the loss or impedance of the circuit. The supervisory equipment must not introduce any spurious signals in the transmission path, for example, as a result of instability. At the same time the supervisory signal must be picked off and the return signal re-inserted without undue attenuation.

According to the present invention there is provided supervisory equipment of the type specified. It includes means at a repeater for extracting supervisory signals from and reinserting them into a two wire transmission line. The supervisory signals are transmitted from a terminal station having two four port. The supervisory equipment further includes two four port branching networks. A first four port branching network is connected by one of its ports or terminals to that output terminal of the repeater which is furthest from said terminal station. A second four port branching network is connected by one of its ports to the transmission line extending in the direction opposite to that of the terminal station. Two further ports of the first network which are adjacent to the terminal connected to the repeater are connected respectively to ports of the second network one of the connected terminals of the second network is adjacent and the other opposite to the port connected to said transmission line. Means are provided for selecting, amplifying and modulating the supervisory signals. These last named means are included in the connection between said last pair of ports.

The invention will now be described with reference to the accompanying drawings in which.

Figure 3:
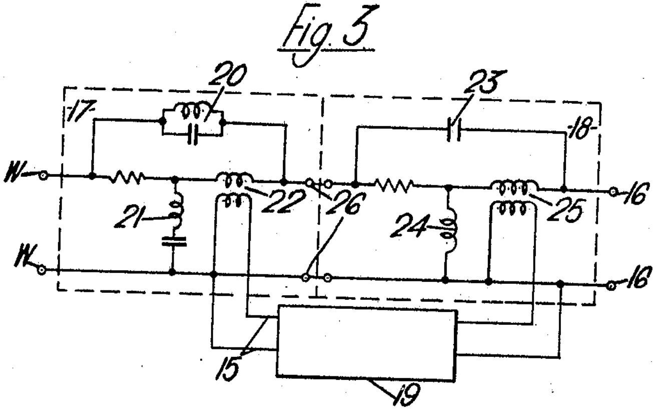

FIG. 3 indicates circuits of branching networks.

Figure 4:
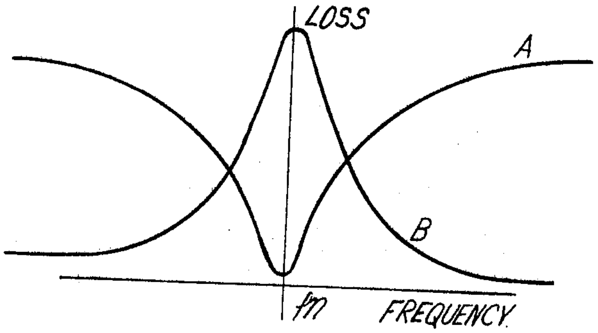

FIG. 4 shows characteristic curves of one of the networks of FIG. 3.

Figure 5:
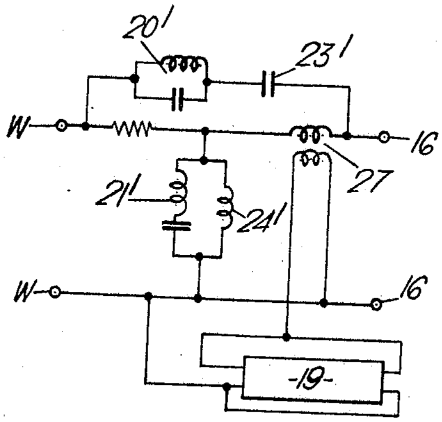

FIG. 5 is an alternative form of a branching network.

Figure 1:
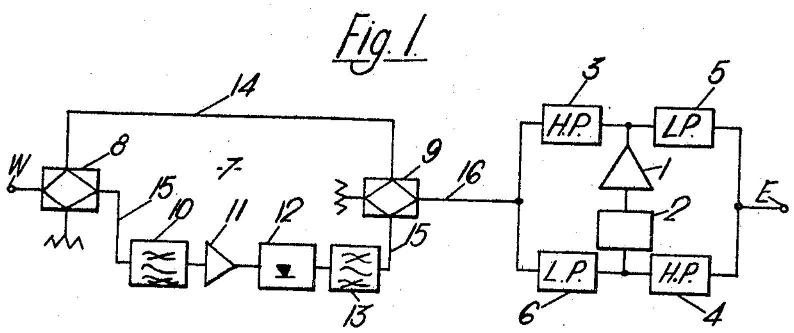
FIG. 1 is a schematic diagram of supervisory equipment at a repeater according to the invention.
Figure 2:
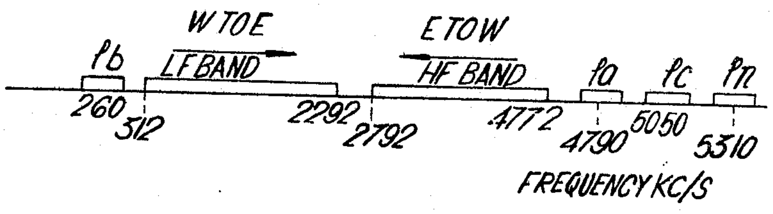
FIG. 2 is a frequency allocation plan.

The general arrangement of the repeater and of the associated supervisory equipment is shown in FIG. 1. The repeater is quite conventional having a one way amplifier 1 and a line equaliser 2 connected between a set of directional filters 3, 4, 5 and 6. The supervisory equipment 7 is connected in tandem with the repeater between the East and West sections W and E of the line. The equipment comprises two four port branching networks 8 and 9 which may be, for example, hybrid transformers. In path 15 interconnecting the two networks there are inserted elements of the supervisory equipment comprising filters 10 and 13, amplifier 11 and modulator 12. For better understanding of the operation of this arrangement reference is made to a typical frequency allocation plan.

As is usual in frequency division multiplex two way, two wire systems, signals transmitted in each direction fall in one of two frequency bands. In the example shown, signals transmitted in the West to East direction fall in the band 312 to 2292 kc./s. and signals transmitted in the opposite direction occupy a band from 2792 to 4772 kc./s. The two components of the interrogating signal transmitted from the terminal to the repeater are indicated by $fa$ and $fc$ respectively. The signal returned from the repeater to the terminal is indicated by $fb$ and the noise band selected at the repeater by $fn$. It will be noted that $fn$ and $fa$ are symmetrical with respect to $fc$ and that $fc-fa=fn-fc=fb$.

When it is desired to test amplifier 1 for gain an interrogation signal comprising frequencies $fc$ and $fa$ is transmitted from the East terminal station. The signal passes through the repeater via high pass filters 3, 4, the amplifier 1 and equaliser 2. In the supervisory equipment the signal passes via branching network 9, conductor 14 and branching network 8 to arm 15. Filter 10 selects the two components of the interrogating signal which after amplification in amplifier 11 intermodulate in modulator 12. A modulation product of frequency *fb* is selected by filter 13 and is returned over the low frequency path of the repeater to the East terminal station.

When amplifier 1 is to be tested for noise the interrogating signal comprises a single component of frequency *fc*. This signal as well as a band of noise generated in the amplifier and centered on *fn* intermodulate in modulator 12 to give again a return signal centered on *fb*. In order that the return signal is only representative of the noise generated at the repeater in question and not of the preceding repeaters a noise stop filter, not shown, can be inserted between branching network 8 and the West line. The stop filter can however be omitted when the attenuation of the line between two adjacent repeaters is sufficiently high to reduce the amplitude of the noise from the preceding sections to a sufficiently low value. It should be noted that in the circuit of FIG. 1 paths 14 and 15 are taken to opposite points of the network 9, but at network 8 they are taken to adjacent points. In this arrangement there is substantially no transmission between lines W and 15 so that traffic signals flow from W to 16 in both directions via path 14. There is also substantially no transmission through network 9 from path 14 to 15. Because of this the singing margin of the loop formed by 8, 15, 9 and 14 which also includes the supervisory equipment 10, 11, 12 and 13, is increased.

The pick-off and reinsert loss for the supervisory signals will depend on the design of the branching networks 8 and 9. If these are unity ratio hybrid transformers the total bridging loss in the arm 15 will be 6 db. In this case the main signal paths from W via arm 14 to conductor 16 will also have a loss of 6 db. The use of skew hybrid transformers can reduce the loss in the main transmission path 14 at the same time increasing the loss in the path 15. The choice of a particular ratio of hybrid transformer will depend on system requirements.

It will further be noted that the loss in the main transmission path W–14–16 is not effected if the input or output of the supervisory equipment which are connected by conductors 15 to the branching networks 8 and 9 are either open or short circuited.

A perferred arrangement to pick-off and reinsert the supervisory signals is shown in FIG. 3. In this figure networks 17 and 18 are used in place of hybrid transformers 8 and 9. The associated repeater is omitted for clarity and details of the supervisory equipment shown by 10 to 13 in FIG. 1 are replaced by block 19. Each of the networks 17 and 18 is a bridged T structure.

Network 17 comprises a parallel tuned circuit in the bridging arm and a series resonant circuit in the shunt arm. One of the series arms of the network is replaced by transformer 22. Tuned circuits 20 and 21 are resonated at the source frequency around 5310 kc./s. The transmission characteristics of this network are shown in FIG. 4. Curve A shows the transmission loss of the network between terminals 26 and 15 as a function of frequency. It will be seen that the resonant frequency, for example *fn* the transmission loss is at a minimum. At the same time the transmission loss between terminals 26 and W as shown by curve B goes through a maximum. It will be apparent to those versed in the art that the transmission of network 17 at frequencies other than *fn* will not be influenced if the windings of transformers 22 are short or open circuited. The pick-off network 17 is seen to combine the desirable properties of low-loss pick-off, isolation between traffic and supervisory signals and high attenuation in the main transmission path to frequencies around *f*.

The network 18 is also a bridged T structure but the bridge arm comprises a substantially capacitive reactance 23 and the shunt arm a substantially inductive reactance 24. The network has a sloping loss-frequency curve providing less attenuation at high frequencies than at low frequencies. The network constitutes therefore a line equaliser which is designed to provide all or part of the equalisation for the repeater section. It can therefore be additional to the equaliser 2 in FIG. 1 or replace it. The supervisory return signal *fb* is reinjected via transformer 25 which replaces one of the series arms of network 18.

The similarity between the circuits 17 and 18 of FIG. 3 and their connection in tandem makes it possible to device a single equivalent circuit having an identical loss-frequency transmission characteristic. This transformation results in the circuit shown in FIG. 5. It will be observed that the bridging arm now comprises a parallel resonant circuit 20′ in series with capacitor 23′ and the shunt arm comprises a series resonant circuit 21′ in parallel with an inducter 24′. The element values of 20′, 21′, 23′ and 24′ will of course differ from those 20, 21, 23 and 24. The circuit of FIG. 5 will also differ from that of FIG. 3 in that the input and output transformers 22 and 25 coalesce into a single transformer 27. For this reason the input and output circuits of the supervisory equipment 19 must be joined together and connected to the output transformer 27. The only disadvantage of this arrangement as compared to that of FIG. 3 is that the singing margin of equipment 19 is somewhat reduced and is solely determined by the filters 10 and 13 shown in FIG. 1.

It is to be understood that the foregoing description of specific examples of this invention is not to be considered as a limitation on its scope.

What I claim is:

1. Supervisory equipment coupled to a repeater for extracting from and reinserting into a two wire transmission line supervisory signals transmitted from a terminal station, said equipment including:

- a first four port branching network connected by one of its ports to that output terminal of the repeater which is furthest from said terminal station,
- a second four port branching network, connected by one of its ports to the transmission line extending in the direction opposite to that of the terminal station,
- two further ports of the first network which are adjacent to that connected to the repeater being connected respectively to ports of the second network one of which is adjacent and the other opposite to the port connected to said line, and means for selecting, amplifying and modulating the supervisory signals included in the connection between said last pair of ports.

2. Equipment as claimed in claim 1 in which each of the two branching networks is arranged to offer a high attenuation to signals flowing from any one port to an opposite port of the network and a substantially low attenuation to adjacent ports.

3. Equipment as claimed in claim 2 in which said branching networks are hybrid transformers and the fourth port of each network is connected to a termination.

4. Equipment as claimed in claim 2 in which the network which is furthest from the repeater is a resonant bridge circuit which is tuned to a component frequency of a supervisory signal to give a band-stop characteristic for signals transmitted between opposite ports and a band-pass characteristic between adjacent ports.

5. Equipment as claimed in claim 2 in which the network which is nearest to the repeater is a reactive bridge circuit comprising reactances selected to give over a band of frequencies used for traffic an attenuation characteristic which decreases with increasing frequency for signals transmitted between opposite ports and an attenuation characteristic which increases with frequency for signals transmitted between adjacent ports.

6. Equipment as claimed in claim 5 in which the supervisory return signal is reinserted into a port of the network which is nearest to the repeater, the value of the impedance connected to said port having substantially no effect on the transmission of traffic signals through the network.

7. Equipment as claimed in claim 4 in which the two networks are combined in a single equivalent network and the supervisory signals are extracted and reinserted through the same port, the value of an impedance terminating this point having substantially no effect on the transmissions of traffic signals through said network.

8. Equipment as claimed in claim 5 in which the two networks are combined in a single equivalent network and the supervisory signals are extracted and reinserted through the same port, the value of an impedance terminating this point having substantially no effect on the transmissions of traffic signals through said network.

References Cited

UNITED STATES PATENTS

| | | | |
|---|---|---|---|
| 2,570,912 | 10/1951 | Bishop | 179—175.31 |
| 2,823,270 | 2/1958 | Cameron | 179—175.31 |
| 3,049,596 | 8/1962 | Sonneborn | 179—175.31 |
| 3,059,068 | 10/1962 | Frankton | 179—175.31 |
| 3,189,694 | 6/1965 | Frankton | 179—175.31 |
| 2,686,849 | 8/1954 | Thomas | 179—175.31 |

KATHLEEN H. CLAFFY, Primary Examiner

ARTHUR A. McGILL, Assistant Examiner